United States Patent Office 3,562,347
Patented Feb. 9, 1971

3,562,347
PROCESS FOR EXTRACT-ISOMERIZATION OF XYLENE ISOMERS
Yoshiro Ito, Tamotsu Ueno, Takashi Nakano, and Kazuo Okamoto, Okayama-ken, Japan, assignors to Japan Gas-Chemical Company, Inc., Tokyo, Japan, a Japanese body corporate
Filed Dec. 11, 1968, Ser. No. 782,994
Claims priority, application Japan, Dec. 15, 1967, 42/80,410
Int. Cl. C07c 7/10, 15/08
U.S. Cl. 260—674          10 Claims

ABSTRACT OF THE DISCLOSURE

In a process for extracting m-xylene as a complex of m-xylene, hydrogen fluoride and boron trifluoride by adding hydrogen fluoride and boron trifluoride to a mixture of xylenes and subjecting the extract phase to decomposition and isomerization, a process for extract-isomerizing m-xylene, characterized by substitute-feeding of a certain portion of hydrogen fluoride and boron trifluoride to be fed into an extracting apparatus in the form of a complex of isomerization reaction product.

BACKGROUND OF THE INVENTION

Field of the invention

Figure 1:
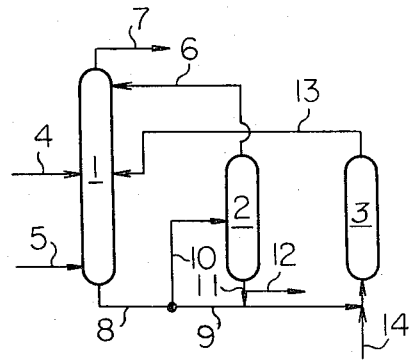

This invention relates to an improved process for extracting m-xylene isomer from xylenes mixture as a complex of m-xylene extracted in the HF phase in the form of a complex of m-xylene, hydrogen fluoride and boron trifluoride by adding hydrogen fluoride and boron trifluoride to a mixture of xylenes and decomposing and isomerizing the thus obtained m-xylene complex into more valuable isomers.

The terms "xylene isomers," "xylene mixture" or "a mixture of xylenes" used herein are defined to include ethyl benzene and are synonymous with $C_8$ aromatic hydrocarbon fraction.

Accordingly, o-xylene, m-xylene, p-xylene, and ethyl benzene are included in the xylene isomers. Of these, o-xylene is usable as raw material of phthalic anhydride, p-xylene as raw material of terephthalic acid, and ethyl benzene as raw material of styrene. Thus, all are widely used for industrial applications. On the contrary, m-xylene does not find its use in any specific areas other than its use as raw material for certain resins, hence, it is of limited value to the industry.

Furthermore, the ratio of existence of these xylene isomers is usually determined on the basis of the theory of equilibrium, and the above-mentioned m-xylene possessing limited industrial value exists in the greatest quantity.

Therefore, m-xylene, obtained while isolating xylene isomers, is usually converted into another xylene isomer through isomerization to give it increased value.

This invention relates to an improved process for extract-isomerizing such xylene isomers with needed equipment simplified and reduced utility requirements.

DESCRIPTION OF PRIOR ART

It is already known that when a mixture of xylenes containing p-xylene, o-xylene, m-xylene, ethyl benzene, etc. is treated with an extracting agent consisting of hydrogen fluoride and boron trifluoride, only m-xylene having high basicity forms a complex of hydrogen fluoride and boron trifluoride and dissolves in a hydrogen fluoride phase, while other xylene isomers remain as a hydrocarbon phase. Inasmuch as the hydrocarbon phase and hydrogen fluoride phase do not dissolve in each other, the two phases are separated by a difference in specific gravity to enable selective isolation of m-xylene.

Isomerization reaction of xylenes is conducted by heating. In this instance, hydrogen fluoride and boron trifluoride may be employed as catalyst, therefore, the extract, which is hydrogen fluoride solution of a complex of m-xylene, hydrogen fluoride and boron trifluoride, can be isomerized as is. In the conventional process, however, the isomerization product is further heated so as to decompose into hydrogen fluoride, boron trifluoride and xylenes, and hydrogen fluoride and boron trifluoride isolated in gaseous form are recycled as extracting agent into the extracting apparatus. The disadvantage of this process is that a substantial amount of heat is required to decompose the complex.

DESCRIPTION OF THE INVENTION

This invention relates to a process for isolating m-xylene from a mixture of xylenes. To be more precise, this invention relates to a process wherein a mixture of xylenes is treated with an extracting agent consisting of hydrogen fluoride and boron trifluoride, and m-xylene contained in the mixture is extracted in the form of a complex solution and the extract phase is subjected to an isomerization process and the isomerized product per se is recycled to the extracting apparatus without being subjected to decomposition.

As a result of assiduous efforts to eliminate the aforementioned drawback of the prior art, the inventors of this invention have discovered that a considerable quantity of hydrogen fluoride and boron trifluoride to be fed into the top of the xylene extracting apparatus can be saved by directly recycling the isomerization reaction product to the xylene extracting apparatus without further addition of heat and decomposition, and have come to this invention.

In other words, in a process for extracting m-xylene as a complex of m-xylene, hydrogen fluoride and boron trifluoride by adding hydrogen fluoride and boron trifluoride to a mixture of xylenes and subjecting the extract phase to decomposition and isomerization, this invention provides a process for extract-isomerizing m-xylene isomer, characterized by substitute-feeding of a certain portion of hydrogen fluoride to be fed into an extracting apparatus in the form of isomerization reaction product.

However, it is impossible to depend on the isomerization reaction for the entire amount of hydrogen fluoride and boron trifluoride to be fed into the extracting apparatus.

Therefore, part of the extract phase needs to be charged into a decomposer to cause the complex to decompose so that it may be fed into the extracting apparatus in the form of hydrogen fluoride and boron trifluoride. Otherwise, the entire amount of the extract phase may be isomerized to enable part of a product so obtained to be fed into the decomposer for the purpose of decomposing the complex so that obtained hydrogen fluoride and boron trifluoride may be recycled to the extracting apparatus. It is desirable that the amount of hydrogen fluoride and boron trifluoride fed into the extracting apparatus in the form of isomerization reaction products will be in the range of 20–70% of the amount of hydrogen fluoride and boron trifluoride present in the extract phase withdrawn from said extracting apparatus. When only 20% or less is fed, it will be of a little help to reduce the heat required for decomposition. On the other hand, dependence of 70% or more on the complex will adversely affect extraction efficiency, and unless hydrogen fluoride and boron trifluoride are separately fed from outside, it will be impossible to isolate a complex solution of high purity m-xylene from a raffinate which does not substantially contain m-xylene.

In this invention, isomerization is allowed to take place in an isomerization reaction apparatus at a temperature in the range of 40–200° C., the preferred range being 60–150° C. and under pressure of from 5–100 kg./cm.$^2$-g., the preferred range being 10–50 kg./cm.$^2$-g.

As the catalyst of isomerization reaction, the extract phase obtained from the extracting apparatus may be used as is. The amount of the catalyst is in the range of 0.15–1.5 moles, preferably in the range of 0.15–0.8 mole as boron trifluoride to one mole of xylene. Thus the extract phase per se may be allowed to pass through isomerization reaction as is.

To prevent a side reaction such as disproportionation reaction, aliphatic hydrocarbon of $C_5$–$C_7$, aromatic hydrocarbon of $C_6$–$C_7$ or methyl benzene such as trimethyl benzene can be mixed into the feed as diluent for isomerization reaction, as the case may be. The amount of diluent for isomerization reaction is in the range of 0.3–3 moles against one mole of xylene. The mole ratio of m-xylene to all of the xylene isomers in the reaction product withdrawn from the isomerization reaction apparatus is in the range of 65–95 mole percent, preferably in the range of 65–85 mole percent. The balance is mainly p-xylene and o-xylene and the amount of ethylbenzene is not more than 1 mole percent. As an isomerization reaction apparatus, a perforated plate tower, a perforated plate pulse tower, packed tower, reaction tower equipped with a stirrer, etc., may be used.

Decomposition reaction is conducted at a temperature (temperature at the bottom of the decomposer) of from 60–250° C., the preferable range being 80–200° C., and under a pressure of from 0.5–30 kg./cm.$^2$-g, the preferable range being 1–20 kg./cm.$^2$-g. For the purpose of preventing a side reaction it is desirable that a diluent having a lower boiling point than xylene such as, for instance, carbon tetrachloride, or saturated hydrocarbon of $C_3$–$C_7$, be refluxed in the decomposer.

As decomposer, plate towers such as a bubble cap tower, a perforated plate tower an appropriate type of thin film evaporator or a rapid evaporator equipped with a high frequency induction heater, etc. is used.

Also, the extracting apparatus may be operated within the temperature range of −20–+30° C. and with internal pressure of from 1–20 kg./cm.$^2$-g. The amount of hydrogen fluoride to be fed is 1.8–25 moles against one mole of the raw material xylene, and the amount of boron trifluoride is 0.7–2.5 moles against one mole of m-xylene in the raw material xylene. It is desirable to select the mole ratio of boron trifluoride/hydrogen fluoride to be used as extracting agent from 0.02–0.20, the preferable range being 0.05–0.14. To improve the selectivity during extraction, it is desirable to feed saturated hydrocarbon of $C_5$–$C_7$ as diluent. Stable substances that do not substantially dissolve in the extracting agent but form a uniform phase with said xylenes i.e., raffinate phase can be used as diluent, for example, saturated aliphatic hydrocarbons such as propane, n-butane, i-butane, n-pentane, and n-hexane; saturated alicyclic hydrocarbons such as cyclopentane, and cyclohexane; or halogenated hydrocarbons such as carbon tetrachloride. When carbon tetrachloride is used, the top and bottom positions of the raffinate and the extract are normally reversed. The amount of diluent to be fed is 0.5–10 moles, preferably 1–5 moles, against one mole of m-xylene withdrawn from the extract withdrawal section. As the case may be, reflux m-xylene is fed to the extract withdrawal section as a reflux, but it is not indispensable. As regards the type of apparatus for extraction, a packed tower, a perforated plate pulse tower, an extracting tower equipped with a stirrer and a mixer settler, etc. can be used.

Figure 2:
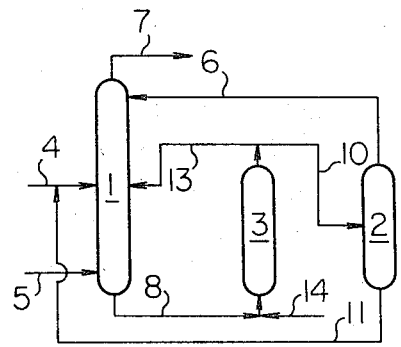
Figure 3:
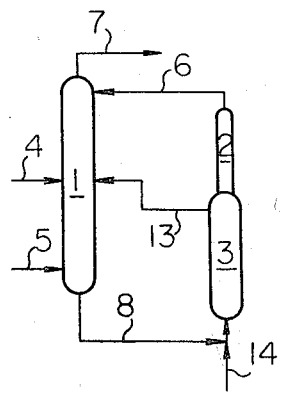

FIGS. 1–3 are flow sheets showing the embodiments of this invention.

FIG. 1 shows the xylene extracting apparatus 1 the decomposer 2 and the isomerization reaction apparatus 3. Through line 4 the raw material, that is, a mixture of xylene and through line 5 the diluent are respectively fed. There are instances when reflux m-xylene is fed through line 5 at the same time. Hydrogen fluroride and boron trifluoride are fed through line 6, while the raffinate which does not substantially contain m-xylene is withdrawn through line 7, and the extract phase containing the complex of high purity m-xylene, hydrogen fluoride and boron trifluoride is withdrawn via line 8. Through line 9, 20–70% of this extracted phase is fed to 3, that is, the isomerization reaction apparatus, together with the diluent for isomerization reaction supplied through line 14 with the remainder fed to the decomposer 2 through line 10. Through line 11 m-xylene obtained by decomposition is either routed to the isomerization reaction apparatus 3 or is taken out as finished product via line 12. Hydrogen fluoride and boron trifluoride are fed to the extracting apparatus 1 via line 6. The reaction product withdrawn from the isomerization reaction apparatus 3 is fed to the middle portion of the xylene extracting apparatus (which is almost the same position as the raw material, that is, the xylene mixture is fed) via line 13.

In FIG. 2, the extracting apparatus is represented by 1, the decomposer by 2, and the isomerization reaction apparatus by 3. Through line 4 the raw material, i.e., the xylene mixture is fed and through line 5 the diluent is fed, while m-xylene is extracted by hydrogen fluoride and boron trifluoride fed through line 6 and the raffinate and the extract phase are withdrawn through lines 7 and 8 respectively. In this process the entire amount of the extract phase is fed to the isomerization reaction apparatus 3 together with the diluent supplied through line 14 for isomerization reaction, and 20–70% of the reaction product is fed to the extracting apparatus 1 via line 13 with the remainder sent to the decomposer 2 through line 10 for decomposition.

Xylene thus decomposed is united with the raw material xylene mixture through line 11, and hydrogen fluoride and boron trifluoride are fed to the extracting apparatus 1 via line 6. In this process, it is impossible to withdraw m-xylene as finished product; however, there is an advantage in that the sensible heat of the isomerization reaction product can be used in the decomposer.

In FIG. 3 the isomerization reaction apparatus and the decomposer are directly connected. The numbers in this figure represent the same as in FIG. 1 and FIG. 2, therefore, they may be readily understood.

EXAMPLE 1

In accordance with the flow sheet given in FIG. 1, one half of the extract phase is fed into the decomposer with the remainder directly fed to the isomerization reaction apparatus to allow extraction, isomerization and decomposition to take place, at which time the material balance of the systems is as shown in the following table. The numbers correspond to those given in said figure.

|   | 4 | 5 | 6 | 7 | 12 | 14 |
|---|---|---|---|---|---|---|
| m-Xylene (mole/hr.) | 41.4 |   |   | 0.1 | 19.6 |   |
| Other xylenes (mole/hr.) | 57.8 |   |   | 79.1 |   |   |
| Hydrogen fluoride (mole/hr.) |   |   | 852 |   |   |   |
| Boron trifluoride (mole/hr.) |   |   | 76 |   |   |   |
| Hexane (mole/hr.) |   | 170 |   | 220 |   | 50.4 |

Incidentally, at this time the temperature of the extracting apparatus is 0° C., pressure 3 kg./cm.$^2$-g.; temperature and pressure of the decomposer 190° C. and 4.5 kg./cm.$^2$-g.; and temperature and pressure of the isomerization reaction apparatus 110° C. and 32 kg./cm.$^2$-g. Hexane is separately refluxed in the decomposer (hexane used in this decomposer performs total reflux in the decomposer, therefore, it does not show up itself in the above material balance). The purity of m-xylene contained in the extract phase withdrawn through line 8 is 99.2%.

REFERENCE EXAMPLE 1

The extraction is conducted under the same conditions as those of Example 1, all of the extract phase are decomposed, the m-xylene thus decomposed is fed to the isomerization reaction apparatus.

To the said apparatus the complex solution of m-xylene hydrogen fluoride and boron trifluoride is separately fed.

The isomerization reaction products is separated to hydrogen fluoride phase and hydrocarbon phase by phase separation, and the hydrogen fluoride phase is refluxed as an isomerization reaction catalyst, and hydrocarbon phase is fed to the extracting apparatus as the raw material xylene mixture. The material balance of this case is shown in the following table.

|  | 4 | 5 | 6 | 7 | 12 | 14 |
|---|---|---|---|---|---|---|
| m-Xylene (mole/hr.) |  | 41.4 |  |  | 0.1 | 19.6 |
| Other xylenes (mole/hr.) |  | 57.8 |  |  | 79.1 |  |
| Hydrogen fluoride (mole/hr.) |  |  |  | 1,075 |  |  |
| Boron trifluoride (mole/hr.) |  |  |  | 96.8 |  |  |
| Hexane (mole/hr.) |  |  | 100 |  | 158 | 58 |

From comparison of these data (with those of Example 1) it is clear that by this invention on the amount of feed hydrogen fluoride and feed boron trifluoride required is substantially reduced.

We claim:

1. In a process for extracting m-xylene in the form of a complex of m-xylene, hydrogen fluoride and boron trifluoride wherein hydrogen fluoride and boron trifluoride are added to a mixture of xylenes, m-xylene is extracted from said mixture, and wherein the resulting extract phase is subjected to decomposition and isomerization, the improvement which comprises charging a portion of the hydrogen fluoride and boron trifluoride to an extractor in the form of an isomerization reaction product obtained by isomerizing a mixture containing m-xylene with hydrogen fluoride and boron trifluoride.

2. The process of claim 1, characterized in that the amount of hydrogen fluoride and boron trifluoride so charged comprises from about 20 to about 70 percent of said extract phase.

3. The process of claim 2, characterized in that a portion of said extract phase is charged to a decomposer to decompose said complex to m-xylene, hydrogen fluoride and boron trifluoride, and said hydrogen fluoride and boron trifluoride obtained by decomposition of said complex are charged to an extractor for extractng said m-xylene, the balance of said extract phase is charged to an isomerizer for isomerizing a xylene, and the resulting isomerization product is recycled directly to said extractor.

4. The process of claim 2, characterized in that the total extract phase is charged to the isomerizer for isomerizing a xylene, a portion of the resulting isomerization product is recycled directly to said extractor and decomposing the balance of the isomerization product.

5. The process of claim 1, characterized by the mole ratio of $BF_3$/xylene in the isomerization reaction being in the range of 0.15–1.5.

6. The process of claim 1, further characterized in that the isomerization temperature is within a range of from 40° C. to 200° C.

7. The process of claim 1, further characterized in that the isomerization reaction is carried out in the presence of a diluent.

8. The process of claim 1, further characterized in that said diluent is selected from the group consisting of a $C_5$–$C_7$ aliphatic hydrocarbon, a $C_6$–$C_7$ aromatic hydrocarbon and polymethyl benzene.

9. The process of claim 7, further characterized in that the amount of diluent for isomerization reaction is within a range of from 0.3–3 moles per mole of xylene fed into an isomerization reactor.

10. The process of claim 1, further characterized in that the operation pressure of an isomerization reactor is within a range from 5–100 kg./cm.$^2$-g.

References Cited

UNITED STATES PATENTS

| | | | |
|---|---|---|---|
| 2,848,518 | 8/1958 | Fragen | 260—674 |
| 3,309,414 | 3/1967 | McCaulay | 260—674 |
| 3,458,590 | 7/1969 | Ueno et al. | 260—674 |

CURTIS R. DAVIS, Primary Examiner

U.S. Cl. X.R.

260—668